Patented Jan. 22, 1935

1,988,757

UNITED STATES PATENT OFFICE 1,988,757

DRY DRESSING SUBSTANCE

Adolf Steindorff, Heinrich Rössner, and Kaspar Pfaff, Frankfort-on-the-Main, Germany, assignors to Winthrop Chemical Company, Inc., New York, N. Y., a corporation of New York No Drawing. Application October 19, 1931, Serial No. 569,850. In Germany October 28, 1930

8 Claims. (Cl. 167—38)

The present invention relates to dry dressing substances.

We have found that valuable dressing substances are obtained by mixing the usual dry dressing substances with small quantities of liquid, high-boiling, water-soluble organic substances; the dressing materials so obtained have considerable advantages over the ordinary dry dressing substances. By the addition of these water-soluble, organic substances the nuisance caused by the tendency of the dry dressing material to emit dust is obviated; this could hitherto only be obtained by adding oil to the material. But in comparison with this known use of oil, the use of dry dressing substances mixed with water-soluble, high-boiling (i. e. boiling above 125° C.), liquid organic substances as herein described involves the essential advantage that, after the dressed seed grains have been sown, the dressing substances can directly act to an increased extent in the soil on access of the moisture, whereas by the addition of oil the water is at first repelled and the fungicide substances, therefore, are prevented from dissolving. By the presence of the water-soluble organic substances the solubility of the materials having the action of a fungicide is at the same time increased on access of water in the soil, so that an increased activity of the dressing substances is attained.

Dry dressing substances which do not emit dust and have a good action are prepared, for instance, from 4% of phenylarsine oxide, 93.5% of talcum and 2.5% of 1.3-butylene-glycol or by grinding together 3 parts of phenyl-mercury acetate, 93 parts of talcum and 4 parts of ethyl glycol. Other mixtures suitable as dry dressing materials consist, for instance, of 97% of $CuCO_3$ and 3% of glycol or 8% of mercury chloride, 5% of glycol-mono-acetate and 87% of a mixture of equal parts of prepared chalk and silicic acid.

Other substances 2 to 5% of which may be added to dry dressing materials are, for instance, glycerine, glycol, glycol-mono-acetate, butyl-glycol, di-acetone-alcohol $CH_3.CO.CH_2.C(OH)(CH_3)_2$, glycol-diacetate, mono-hydroxy-acetone, 1.3-propylene-glycol, chlorhydrine, chloro-propionic acid and ethyl-formamide.

2 to 5% of these and similar substances are added to the usual substances having the action of a fungicide and suitable for dry dressing seeds, or they are added to mixtures of these substances with indifferent extenders, such as talcum, kieselguhr etc., whereby the advantages above described are attained.

We claim:

1. A dry dressing composition comprising about 3–8 parts of a compound possessing a fungicidal action and about 2–5 parts of a water-soluble liquid compound of the formula R.O.R' wherein R stands for an aliphatic hydrocarbon radical which may be substituted by hydroxyl, oxygen, chlorine or O-acyl, and R' stands for hydrogen, hydroxyl, alkyl, NH-alkyl or acyl, said compound possessing a boiling point above 125° C. and having the property of binding or laying dust, the rest of the composition being an inert diluent.

2. A dry dressing composition comprising about 3–8 parts of a compound possessing a fungicidal action and about 2–5 parts of a water-soluble liquid polyvalent alcohol having a boiling point above 125° C. and the property of binding or laying dust, the rest of the composition being an inert diluent.

3. A dry dressing composition comprising about 3–8 parts of a compound possessing a fungicidal action and about 2–5 parts of a water-soluble liquid polyvalent alcohol ester having a boiling point above 125° C. and the property of binding or laying dust, the rest of the composition being an inert diluent.

4. A dry dressing composition comprising about 3–8 parts of a compound possessing a fungicidal action and about 2–5 parts of a water-soluble liquid divalent alcohol having a boiling point above 125° C. and the property of binding or laying dust, the rest of the composition being an inert diluent.

5. A dry dressing composition comprising about 3–8 parts of a compound possessing a fungicidal action and about 2–5 parts of a water-soluble liquid divalent alcohol ester having a boiling point above 125° C. and the property of binding or laying dust, the rest of the composition being an inert diluent.

6. A composition of matter comprising about 4 parts of phenylarsine oxide, about 2.5 parts of 1.3-butyleneglycol and about 93.5 parts of talc.

7. A composition of matter comprising about 8 parts of mercury chloride, 5 parts of glycol-mono-acetate and 87 parts of a mixture of equal parts of prepared chalk and silicic acid.

8. A composition of matter comprising about 3 parts of phenylmercury-acetate, about 4 parts of ethyl-glycol and about 93 parts of talc.

ADOLF STEINDORFF.
HEINRICH RÖSSNER.
KASPAR PFAFF.